United States Patent
Metzger et al.

(10) Patent No.: US 11,701,980 B2
(45) Date of Patent: Jul. 18, 2023

(54) METHOD FOR OPERATING A CHARGING PARK FOR ELECTRIC VEHICLES

(71) Applicant: Dr. Ing. h.c. F. Porsche Aktiengesellschaft, Stuttgart (DE)

(72) Inventors: Christian Metzger, Tamm (DE); Eric Vogel, Stuttgart (DE); Jochen Schukraft, Untergruppenbach (DE); Iosif-Norbert Gaier, Oberriexingen (DE); Moritz Assig, Sindelfingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 257 days.

(21) Appl. No.: 17/120,446

(22) Filed: Dec. 14, 2020

(65) Prior Publication Data

US 2021/0252988 A1 Aug. 19, 2021

(30) Foreign Application Priority Data

Feb. 18, 2020 (DE) .................... 10 2020 104 143.8

(51) Int. Cl.
*H02J 7/00* (2006.01)
*B60L 53/302* (2019.01)

(52) U.S. Cl.
CPC ........... *B60L 53/302* (2019.02); *H02J 7/0045* (2013.01)

(58) Field of Classification Search
CPC .............................. B60L 53/302; H02J 7/0045
USPC ....................................................... 320/109
See application file for complete search history.

(56) References Cited

U.S. PATENT DOCUMENTS

| 2009/0143929 | A1* | 6/2009 | Eberhard | B60L 58/16 |
| | | | | 903/907 |
| 2011/0193522 | A1* | 8/2011 | Uesugi | B60L 53/64 |
| | | | | 320/109 |
| 2011/0246252 | A1* | 10/2011 | Uesugi | G06Q 50/06 |
| | | | | 705/7.12 |
| 2019/0016225 | A1* | 1/2019 | Zies | H05K 7/20927 |

FOREIGN PATENT DOCUMENTS

| CN | 204130973 U | * | 1/2015 | |
| CN | 207338673 U | | 5/2018 | |
| DE | 102015101140 A1 | | 7/2016 | |
| WO | 2011145939 A2 | | 11/2011 | |
| WO | WO-2012065897 A2 | * | 5/2012 | .......... B60L 11/1818 |

OTHER PUBLICATIONS

English Translation of the Chinese Office Action for Chinese Application No. 202110097686.0, dated Mar. 28, 2023, 3 pages.

* cited by examiner

*Primary Examiner* — Robert Grant
(74) *Attorney, Agent, or Firm* — RatnerPrestia

(57) ABSTRACT

A method for operating a charging park for electric vehicles. The charging park has a group of charging points which are connected to a central cooling module, wherein components of the respective charging point are cooled as a function of a temperature of the respective component in the charging mode or in the standby mode, as a function of a charging status at the respective charging point and as a function of an ambient temperature.

17 Claims, 4 Drawing Sheets

METHOD FOR OPERATING A CHARGING PARK FOR ELECTRIC VEHICLES

CROSS-REFERENCE TO RELATED APPLICATION

Figure 1:
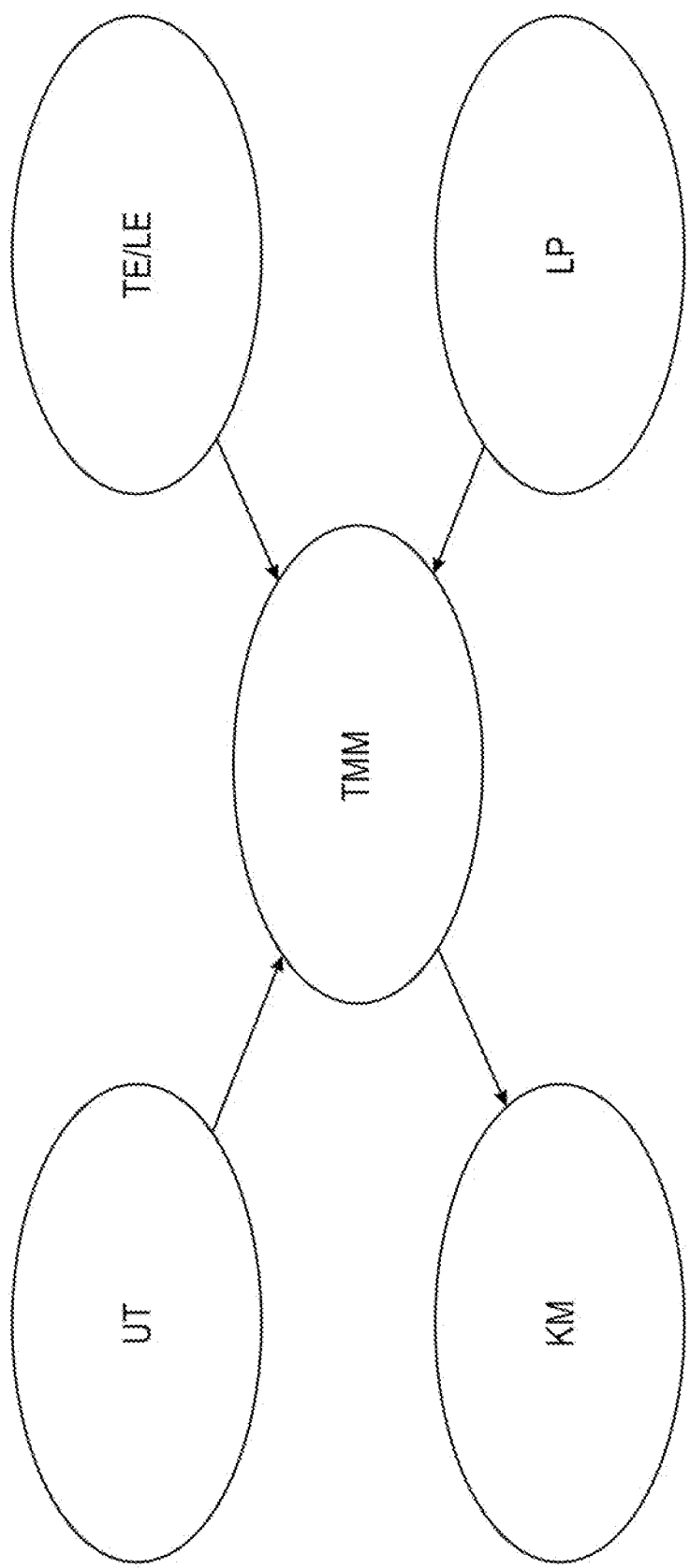

This application claims priority to German Patent Application No. 10 2020 104 143.8, filed Feb. 18, 2020, the content of such application being incorporated by reference herein in its entirety.

FIELD OF THE INVENTION

The invention relates to a method for operating a charging park for electric vehicles.

BACKGROUND OF THE INVENTION

WO 2011/145939 A2, which is incorporated by reference herein, discloses a method for operating a charging park for electric vehicles. This charging park has an air-based or liquid-based cooling system in order to carry away heat from inverters. The intention here is to make it possible to equip power electronics in a simpler manner.

DE 10 2015 101 140 A1, which is incorporated by reference herein, describes a charging station for outputting electrical energy to a receiver of electrical energy. The charging station has a cooling device by means of which a charging plug which is in a parked position can be cooled. The cooling is carried out by means of a blower.

SUMMARY OF THE INVENTION

Described herein is a method for operating a charging park for electric vehicles which ensures efficient cooling of charging points of the charging park.

In the method for operating the charging park for electric vehicles there is provision that the charging park has a group of charging points which are connected to a central cooling module, wherein components of the respective charging point are cooled as a function of a temperature of the respective component in the charging mode or in the standby mode, as a function of a charging status at the respective charging point and as a function of an ambient temperature.

The respective charging point is a charging station. In the region of this charging station the charging of the electric vehicle which is respectively parked there takes place. The central cooling module constitutes a common cooling module for the group of charging points. In a specific case, this is a maximum of three power electronics modules and three charging cables. For example, just one charging point, i.e. one power electronics module and one charging cable, can also be connected to a cooling module. The charging points which constitute a group are therefore connected to a single central cooling module of this group. The components of the respective charging point are cooled as a function of an ambient temperature, which is to be understood as being the outside temperature.

This method for operating a charging park for electric vehicles permits high efficiency by cooling the group of charging points in accordance with the requirements.

It is considered particularly advantageous if the charging park has a plurality of cooling clusters, wherein the respective cooling cluster has the group of charging points which are connected to the central cooling module. For each group of charging points the cooling cluster therefore has a single central cooling module. This results in a high overall level of system efficiency as a result of the cooling in accordance with the requirements for each cooling cluster.

According to one preferred development there is provision that the respective cooling cluster has charging points, power electronics modules and charging systems. Here, the number of charging points, power electronics modules and charging systems is random, but is in each case >0.

It is considered particularly advantageous if via the central cooling module all the power electronics modules and charging pillars of all the charging systems are cooled in a primary circuit by means of a cooling fluid. In this context, a high level of efficiency of the cooling can be achieved by the use of the cooling fluid.

According to one preferred development there is provision that via a heat exchanger which is assigned to the respective charging pillar a charging cable and/or a charging plug is cooled in a secondary circuit by means of a cooling fluid.

It is considered particularly advantageous if the charging park is controlled by means of a charging management server. This charging management server is preferably supplied with the following information from control devices in order to specify a required cooling stage for the respective cooling cluster:

a. The current forward flow and return flow temperature of the power electronics module,
b. The detection of a charging process by means of a charging process status and the cooling demand required by it,
c. The current ambient temperature by means of a temperature sensor on the central cooling module, and
d. The current temperature of the charging cable.

According to one preferred development of the method there is provision that the cooling is controlled in a control cascade with two control circuits. There is preferably provision that an inner control circuit controls a forward flow temperature as a function of a required cooling capacity of the respective central cooling module. According to one preferred development there is also provision that an outer control circuit controls a forward flow temperature as a function of the ambient temperature of the charging system and the system status.

Particularly before a change into a standby mode, cooling occurs over a cooling runon time when no electric vehicle is detected at the charging point or in the cooling cluster.

The described invention and its developments permit efficient thermal management of the charging park.

According to one aspect of the described development, a high overall system efficiency level is ensured by cooling in accordance with the requirements for each cooling cluster. This is the case because the respective group of charging points is connected to a central cooling module. A high charging capacity is directly available at the start of the charging process by virtue of preliminary temperature regulation of the power electronics modules and in particular of the charging cable in the standby mode. The operating comfort is increased by virtue of preliminary temperature regulation of the charging plug. In addition, condensation water, in particular in the charging pillar, can be avoided or reduced by means of an intelligent cooling controller, in particular when the external temperature is raised. At low external temperatures, a recirculating function of the cooling fluid is provided. The operation of the charging park can be adapted to various fields of use, that is to say use in hot countries or cold countries, and to the size of the charging system.

BRIEF DESCRIPTION OF THE DRAWING FIGURES

Further features of the invention can be found in the dependent claims, the appended drawing and the description, without being limited thereto.

Figure 2:
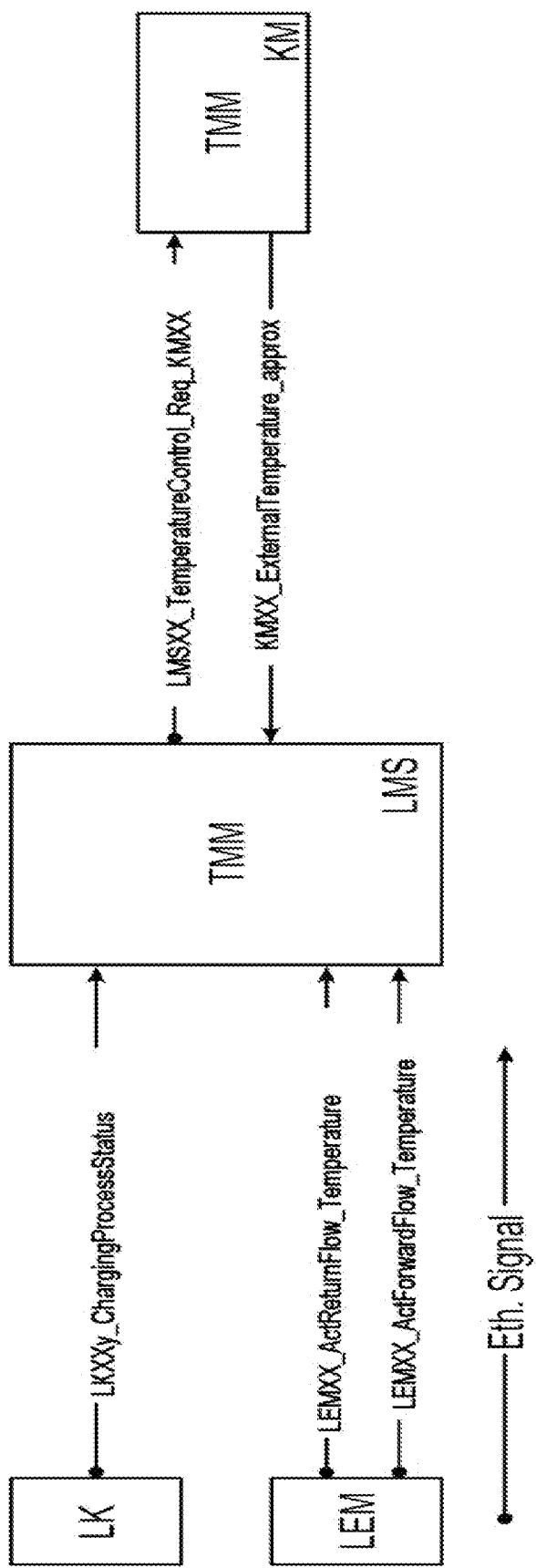
Figure 3:
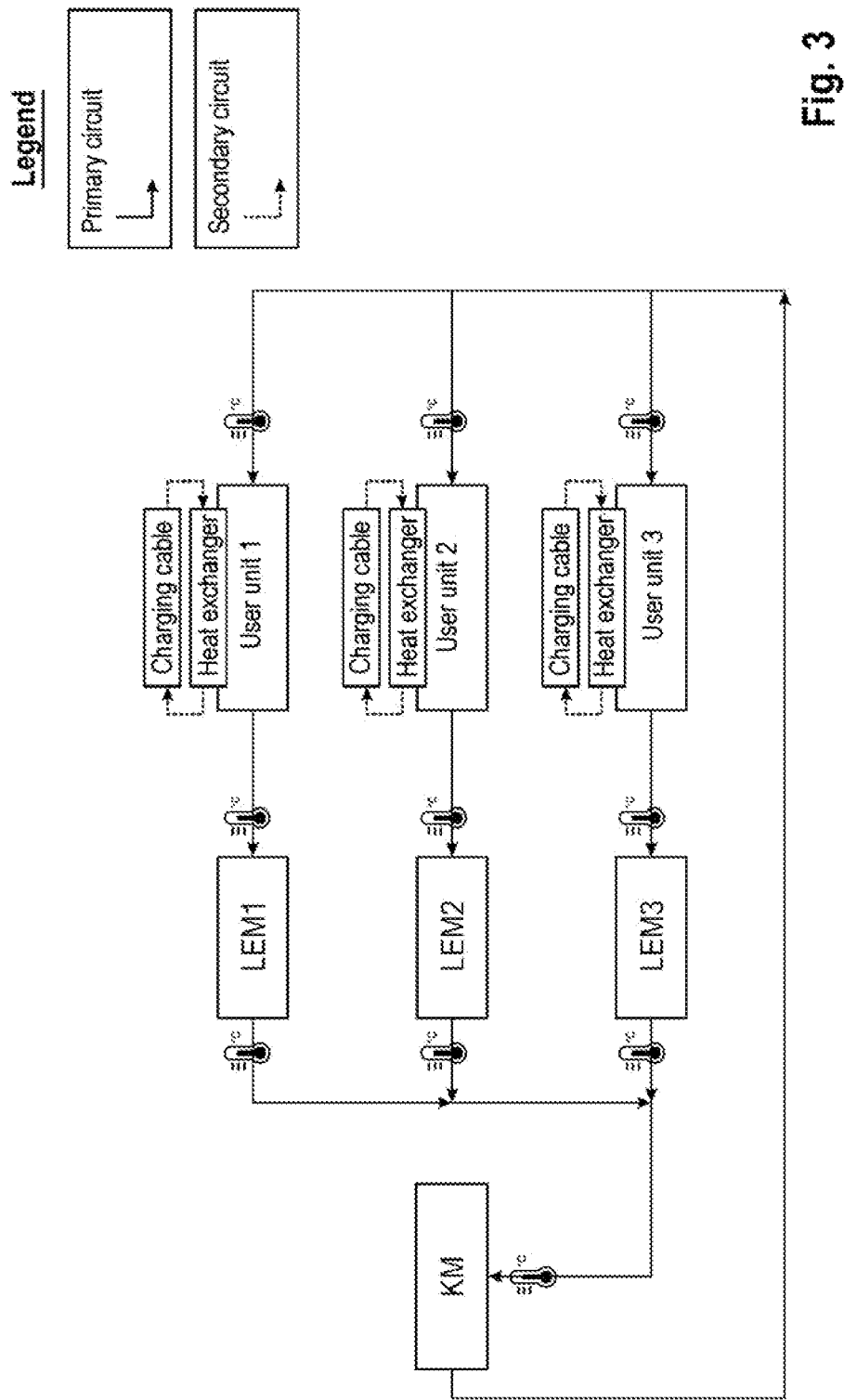
Figure 4:
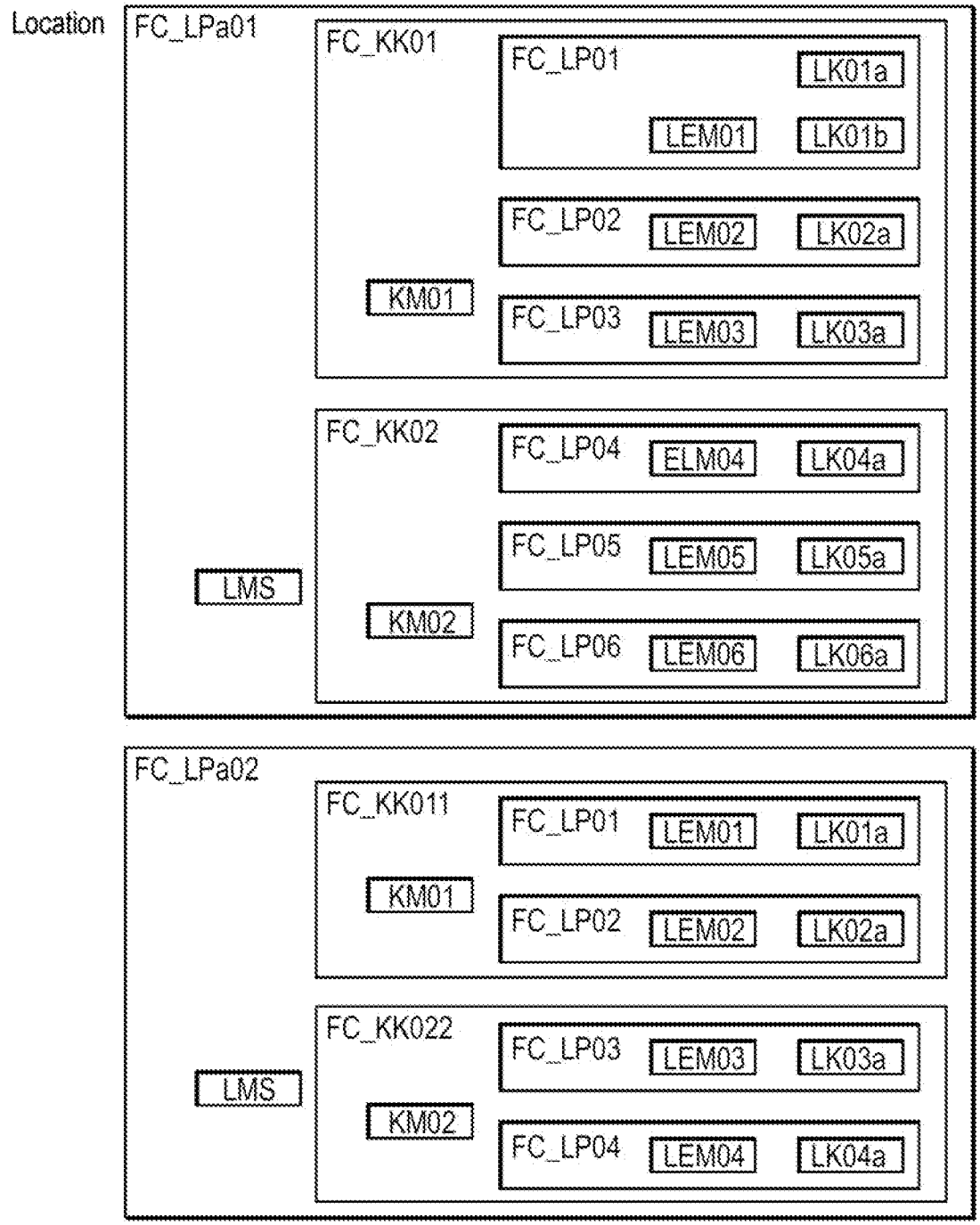

In the drawing:

FIG. 1 shows a system overview for clarifying the method according to aspects of the invention, FIG. 2 shows details relating to the system overview, FIG. 3 shows a flow diagram of a cooling cluster, and FIG. 4 shows an illustration clarifying the clustering, as well as a plurality of cooling clusters.

DETAILED DESCRIPTION OF THE INVENTION

The method relates to the operation of a charging park for electric vehicles. The charging park has a group of charging points, just one charging point LP of which is illustrated in FIG. 1. The group of charging points is connected to a central cooling module KM. Components of the respective charging point are cooled as a function of a temperature of the respective component in the charging mode or in the standby mode, in addition as a function of a charging status at the respective charging point, and as a function of an ambient temperature UT, that is to say the external temperature. The temperature TE/LE of the individual components in the standby mode or charging mode is communicated to a central thermal management system TMM. The respective charging point LP communicates details relating to the active charging process to the thermal management system TMM. In addition, the external temperature UT is communicated to the thermal management system TMM. The thermal management system TMM communicates a specification stage to the cooling module KM, and in this way the cooling temperature is specified to the cooling module KM by the thermal management system TMM.

FIG. 2 illustrates the interaction of the thermal management system TMM, charging management server LMS, power electronics module LEM, charging controller LK and cooling module KM.

The transmission of the respective signals between the components is carried out, in particular, by means of Ethernet.

In this context, the charging management server LMS is the function master in the thermal management system TMM and uses the following information from the control devices to specify the required cooling stage for each cooling cluster:

Lem:

Current forward flow and return flow temperature of the power electronics module (LEM) via the signals:
LEMXX_ActReturnFlow_Temperature
LEMXX_ActForwardFlow_Temperature

LK:

Detection of a charging process by means of the "LKXXy_ChargingProcessStatus" signal and the cooling demand required by it:
0x2 EV_Connected (vehicle plugged in) or
0x3 ISO_Measurement (isolation measurement) or
0xD Preparing (GB/T) (preparation of charging) or
0x4 Precharge (precharging) or
0x5 Charging (charging) or
0xC Reconnect (GB/T) (reconnection)

KM:

The current external temperature (KMXX_ExternalTemperature_approx) by means of the temperature sensor on the cooling module, in order to increase the cooling temperature when the external temperature is raised and to reduce/prevent condensation water.

FIGS. 3 and 4 relate to a cooling cluster or diverse cooling clusters which form cooling clustering. The number of charging points, power electronics modules and charging systems per cooling cluster is random here, but is in each case >0. The number of cooling clusters for the thermal management system is also random, but is in each case >0. A control cascade composed of two control circuits is provided. An inner control circuit for the forward flow temperature control as a function of the required cooling capacity (implementation at one of the central cooling modules KM). Another control circuit for forward flow temperature control as a function of the ambient temperature UT of the charging system and of the system status. The setting of operating points (temperature stages) can be adjusted individually by means of remote diagnosis. Before a change into standby mode, a runon time of any desired duration is possible in order to dissipate residual heat.

FIG. 3 shows a cooling cluster with the assigned cooling module KM and three power electronics modules LEM (LEM1, LEM2, LEM3) with a forward flow temperature which is measured in the flow direction of the cooling fluid upstream of the respective power electronics module LEM, and a return flow temperature measured downstream of this power electronics module LEM. The cooling module KM directs the cooling fluid through three user units corresponding to three charging points, in order to cool them. A heat exchanger interacts with each user unit which is cooled in a primary circuit, said heat exchanger serving to cool the charging cable and possibly in addition the charging plug via a secondary circuit. The forward flow temperature of the respective user unit is also measured for the purpose of temperature control.

FIG. 4 shows, in respect of the clustering, four individual clusters, wherein the respective cluster is assigned a cooling module KM, and each cluster has a different number of power electronics modules LEM and charging controllers LK. For example, the cooling cluster FC_KK01 has the one cooling module KM01 and three power electronics modules LEM01, LEM02 and LEM03, wherein the power electronics module LEM01 is assigned two charging controllers LK01a and LK01b, wherein the power electronics module LEM02 is assigned a charging controller LK02a, and the further power electronics module LEM03 is assigned a charging controller LK03a. The cooling clusters FC_KK01 and FC_KK02 which are illustrated with respect to the cooling modules KM01 and KM02 according to FIG. 4 are assigned a charging management server LMS. These statements apply correspondingly to the other illustrated cooling clusters FC_KK011 and FC_KK022.

The request for the required cooling capacity from the charging management server LMS to the cooling module KM is made using the signal "LMSXX_TemperatureControl_Req_KMXX" with the following stages:

Stage 0:

If the cooling capacity cannot be calculated as a result of a communications failure of the control devices which are involved, the cooling module adjusts the forward flow temperature itself to a presettable rated temperature value.

Stage 1:
   The cooling module is to change into the standby mode if no vehicle is detected in the cooling cluster and correspondingly there is no cooling demand.
   Cooling is carried out autonomously in order to protect components when there is demand from the cooling module.
Stage 2:
   If the forward flow or return flow temperature of a power electronics module (LEM) in the standby mode rises above an upper temperature limit, the cooling module KM must cool the primary circuit to a lower temperature limit (preliminary temperature regulation). In this way, the LEM is kept in the optimum operating range. Furthermore, it is possible to specify the power electronics module on the basis of the power which is currently output (prediction of the expected power loss and therefore the temperature). This would be an alternative implementation method to that described.
   Temperature limits with a permitted maximum temperature and switch-off temperature for the preliminary temperature regulation can be adapted, so that different fields of use (hot country or cold country) and the size of the charging park can be taken into account.
   In the case of an external temperature below a settable limiting value, stage 2 is activated (recirculation function to protect against frost), in order to ensure protection of the components. This function can be implemented in the inner or outer control circuit. It is implemented in the inner control circuit here.
Stage 3:
   If a charging process is detected in the cooling cluster, the cooling module must cool the primary cooling circuit to a rated temperature value.
Stage 4:
   Cooling with a forward flow temperature which is increased in comparison with the rated temperature value, in order to reduce the formation of condensation water or even avoid it entirely.
   Stage 4 is adopted only if a charging process is detected.
   Before the change into the standby mode (stage 1), a runon time of any desired duration is possible, in order to dissipate residual heat. The exception is the change from stage 0 to stage 1.

What is claimed:

1. A method for operating a charging park for electric vehicles,
   wherein the charging park has a group of charging points which are connected to a central cooling module, said method comprising:
   cooling components of a respective charging point (i) as a function of a temperature of a respective component at the respective charging point in either a charging mode or a standby mode, (ii) as a function of a charging status at the respective charging point, and (iii) as a function of an ambient temperature.

2. The method as claimed in claim 1, wherein the charging park has a plurality of cooling clusters, wherein the respective cooling cluster has the group of charging points which are connected to the central cooling module.

3. The method as claimed in claim 2, wherein the respective cooling cluster has charging points, power electronics modules and charging systems, wherein the number of charging points, power electronics modules and charging systems is random.

4. The method as claimed in claim 3, wherein, via the central cooling module, all of the power electronics modules and charging pillars of all of the charging systems are cooled in a primary circuit by a cooling fluid.

5. The method as claimed in claim 4, wherein, via a heat exchanger which is assigned to the respective charging pillar, a charging cable and/or a charging plug is cooled in a secondary circuit by the cooling fluid.

6. The method as claimed in claim 5, wherein the charging park is controlled by a charging management server.

7. The method as claimed in claim 6, wherein the charging management server is supplied with the following information from control devices in order to specify a required cooling stage for the respective cooling cluster:
   a. a current forward flow temperature and a return flow temperature of the power electronics module, wherein the forward flow temperature is measured upstream of the power electronics module and the return flow temperature is measured downstream of the power electronics module,
   b. a detection of a charging process by a charging process status and the cooling demand required by the charging process,
   c. a current ambient temperature by way of a temperature sensor on the central cooling module, and
   d. a current temperature of the charging cable.

8. The method as claimed in claim 1, wherein the cooling is controlled in a control cascade with two control circuits.

9. The method as claimed in claim 8, wherein an inner control circuit controls a forward flow temperature as a function of a required cooling capacity of the respective central cooling module.

10. The method as claimed in claim 8, wherein an outer control circuit controls a forward flow temperature as a function of an ambient temperature of the charging system and a system status.

11. The method as claimed in claim 2, wherein before a change into the standby mode, cooling occurs over a cooling run-on time when no electric vehicle is detected at the charging point or in the cooling cluster.

12. The method as claimed in claim 1, wherein each charging point has a charging pillar, a charging cable and/or a charging plug assigned to the respective charging pillar, a heat exchanger assigned to the respective charging pillar for cooling the charging cable and/or charging plug, and a power electronics module associated with the charging pillar.

13. The method as claimed in claim 12, wherein, via the central cooling module, the power electronics module and the heat exchanger are cooled in a primary circuit by a cooling fluid.

14. The method as claimed in claim 13, wherein the power electronics module is positioned downstream of the heat exchanger.

15. The method as claimed in claim 14 further comprising the step of measuring a fluid temperature in the primary circuit at a first location upstream of the heat exchanger, at a second location between the heat exchanger and the power electronics module, and at a third location downstream of the power electronics module.

16. The method as claimed in claim 13, further comprising a secondary circuit interconnecting the heat exchanger with the charging cable.

17. The method as claimed in claim 16, wherein the heat exchanger transfers thermal energy between the primary circuit and the secondary circuit.

* * * * *